Patented May 2, 1944

2,347,678

UNITED STATES PATENT OFFICE 2,347,678

EMULSION

Kenneth M. Gaver, Columbus, Ohio, assignor to The Komel Corporation, Dayton, Ohio, a corporation of Delaware No Drawing. Application February 15, 1941,
Serial No. 379,126

6 Claims. (Cl. 252—311.5)

This invention relates to new emulsifying and dispersing products, and more particularly to an improved amylaceous composition which is useful as a wetting agent in forming emulsions and in compounding various compositions wherein it is required to disperse solid or liquid particles uniformly throughout a "carrier."

It is an object of this invention to provide a wetting and dispersing agent which substantially reduces the surface tension of aqueous solutions and is useful in forming coating and impregnating compositions for treating fibrous material including paper, cloth, leather and the like.

It is another object to provide an amylaceous product comprising a colloidal dispersion of alkali metal starchate in water which possesses greatly superior dispersing and wetting properties as compared with the conventional starch compositions.

Another object is to provide a metallic hydrophilic colloid product which is soluble in water and is adapted for incorporating with pigments, oils, resins, waxes, and the like to function as a so-called "protective colloid" to assist in forming dispersions of these substances in different vehicles.

Another object is to provide an alkali metal amylaceous emulsifying agent which forms low viscosity solutions in water and has marked wetting and dispersing properties.

These and other objects and advantages will be apparent from the following description.

My invention is based upon the discovery that an improved composition or emulsifying product is obtained by reacting starch with alcohol soluble hydroxides, such as sodium, potassium, and the like, under conditions such that the metallic starch alcoholate is produced wherein the alkali metal is attached through an oxygen atom to a carbon atom in the 2 position in the complex α-glucopyranose or α-glycopyranose residue. This alkali metal starch alcoholate compound, when dissolved in water, forms a limpid solution which provides an improved emulsifying vehicle. This composition may be used for the emulsifying of substances, such as oil, resins, waxes and synthetic substances wherein it is desired to uniformly disperse the water insoluble particles throughout an aqueous vehicle. My composition may also be utilized as a wetting agent for dispersing pigment particles in the preparation of paints, lacquers and enamels. My emulsifying and wetting product is entirely different from ordinary starch in that my product is readily soluble in water and yields a filtrable low viscosity solution.

The method of making the alkali metal starchate which is used in forming my improved wetting and emulsifying agent may comprise reacting 417 pounds of flake caustic soda or caustic potash in approximately 500 gallons of industrial ethyl alcohol. The mixture is allowed to stand to precipitate the carbonate impurities present which are removed by filtration.

Approximately 500 pounds of dry starch (i. e. potato starch) is introduced into the alcoholic NaOH solution and the whole mixture refluxed for two hours below 98 degrees C. while being vigorously stirred. The product is then filtered and washed free of alkali with ethyl alcohol and the filter product consisting of sodium starchate is dried below 78° C. in a vacuum oven equipped with means for preventing entry of carbon dioxide and means for recovery of the alcohol.

The dry product is then ground, screened and packed in substantially airtight containers. This process gives a yield of about 94.4% to 99.9% in case of potato starches and 79–82% in case of rice starch.

The sodium starchate compound formed as described is readily soluble in water with spontaneous hydrolysis, whereas the original starch is insoluble. It may be defined by the general formula

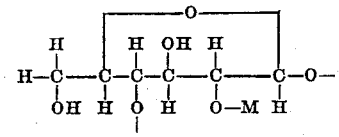

wherein M represents an alkali metal.

In producing the sodium starchate, other sources of starch may be employed such as that derived from corn, wheat, potatoes, sago, arrowroot, cassava, etc.

Further details regarding metallic starchates and the method for their preparation are given in my copending application Serial No. 357,995, field September 23, 1940.

The sodium starchate made according to the above is then dissolved in water to form an aqueous dispersion. This forms a product which possesses a very low viscosity as compared with an ordinary solution of starch in sodium hydroxide. Furthermore, sodium hydroxide starch addition products, as have heretofore been made, do not possess the property of lowering the surface tension of water as low as with the use of the sodium starchate product made as described in the foregoing. This formation of aqueous solutions of sodium starchate which possess a high filterability and emulsifying properties is unexpected with the increased quantities of combined sodium hydroxide. Further, this is in direct contrast to conventional solutions of starch and alkali.

The following examples illustrate the various uses to which my new wetting and emulsifying agent can be utilized:

EXAMPLE I

An oil-in-water emulsion of mineral oil may be made by dispersing the oil in about a 30% aqueous solution of sodium starchate. Higher concentrations of starchate solutions, however, may be utilized if desired. The starchate emulsifying agent may be conveniently made up as follows:

Emulsifying agent "A"

50 parts by weight of sodium starchate is dissolved in from 75 to 100 parts by weight of water. The water may be heated or used cold and the sodium starchate gradually stirred into the water to form a colloidal dispersion having a syrupy consistency. If desired, the sodium starchate may be introduced as a powder into the mixture but I prefer to use an aqueous solution of the sodium starchate.

EXAMPLE II

In this example an aqueous emulsion of wax may be produced by mixing 50 parts by weight of paraffin wax, 25–40 parts stearic acid and from 5–10 parts by weight of sodium starchate emulsifying agent "A" made up as described under Example I. More water may be added to form a more limpid emulsion and the proportions of ingredients adjusted to produce a product having the desired viscosity. The composition may be utilized as a waterproof wax composition. Further, other waxes such as used for making floor waxing compositions and the like may be substituted for paraffin wax.

A liquid polishing wax can be made by forming an emulsion of carnauba wax in a 10% solution of sodium starchate. This forms an aqueous wax dispersion which both cleans and waxes surfaces simultaneously when applied thereto.

EXAMPLE III

In the preparation of emulsion-type inks the oil, pigments, modifying agents and water are emulsified by incorporating sodium starchate solution "A" as an emulsifying agent up to about a 30% solution. In this type of inks, water is employed as the exterior phase and the interior phase consists of the oily substances. The use of sodium starchate solution as an emulsifying agent provides emulsions of improved stability and due to the process of making sodium starchate, the sac around the starch granule is not destroyed and the introduction of the sodium molecule into the starch granules produces a sodium starchate particle which adsorbs the oil particles onto its surface and when dispersed in water the starchate granules rupture spontaneously and uniformly distribute the oil particles throughout the vehicle forming a smooth stable emulsion.

In the preparation of the emulsion-type inks, the pigment particles, such as carbon black and the like which are used, may be first admixed with sodium starchate, either dry particles or in aqueous dispersion, to coat the particles of pigment and function as a surface-active agent to assist in dispersing the pigment particles in the emulsion.

EXAMPLE IV

As an example of an intaglio ink made utilizing my improved emulsifying agent, 15–20 parts by weight of asphalt, such as gilsonite, or equivalent bituminous substance is dissolved in 40–60 parts by weight of petroleum hydrocarbon solvent and emulsified in about from 30–40 parts by weight of water by adding from 5–10 parts by weight of sodium starchate solution emulsifying agent "A." This produces a smooth uniform emulsion which can be employed for intaglio printing. The sodium starchate may be used as a dry colloid and is admixed with the powdered gilsonite and when incorporated with water the asphalt particles are dispersed throughout the aqueous vehicle prior to adding the hydrocarbon solvent.

The mixture is vigorously stirred or passed through a homogenizing machine to form a uniform emulsion wherein thin films of the oily ingredient comprising gilsonite dissolved in hydrocarbon solvent are distributed uniformly throughout the resulting product. Pigment may be similarly dispersed in the mixture by coating the pigment particles with sodium starchate and admixing the same into the liquid vehicle.

EXAMPLE V

In compounding paints, enamels, and the like, wherein pigment particles are to be thoroughly dispersed in an oil vehicle, such as varnish, the pigment may be emulsified with the varnish by using sodium starchate solution "A" as a wetting agent.

The pigment particles are first thoroughly admixed with sufficient sodium starchate solution to coat the particles and thereafter the coated particles are emulsified with the varnish. To remove the water in order to form an oil-pigment paste, the emulsion is broken by the addition of acid or water soluble acid salts and the water separated from the mass by filtration or decanting. In this way, a dispersion of the pigment particles in the oil vehicle is effected without grinding the pigment in the oil, which has been the common practice in the preparation of paints and pigment pastes.

The foregoing examples illustrate some of the different uses to which my new emulsifying agent is adapted, but it will be appreciated that my sodium starchate emulsifying agent is applicable to other uses for which dispersing and emulsifying agents are employed. The sodium starchate emulsifying agent of this invention has improved wetting and dispersing properties due to the chemically combined alkali metal in the starch molecule. The sodium starchate particles retain the starch granules and produce a product which when brought in contact with water spontaneously ruptures due to the activity of the alkali metal ion, particularly sodium. By combining the active sodium ion with the well known colloidal dispersing properties of starch I have produced a greatly superior wetting and emulsifying agent which can be used either in the powdered form or in a colloidal aqueous solution. The dispersion of pigments, resins, oil, and the like may be effected, for example, by mixing or grinding the insoluble or difficultly soluble substances with a dispersing agent in the presence of water or by forming an admixture wherein the particles are precipitated in the presence of the dispersing agent producing a paste or liquid product wherein the solid or oil particles are thoroughly dispersed in the vehicle forming a smooth homogeneous product.

It will be understood that the particular proportions set forth in the foregoing examples are merely typical and that my invention covers broadly the preparation of emulsions, dispersions and similar compositions wherein my alkali metal amylaceous wetting and emulsifying agent is utilized for forming uniform homogeneous dispersions. Further, varying proportions of ingredients may be employed depending upon the type of "carrier" and the kind of product desired.

It will also be understood that my invention is adapted for widely different embodiments wherein wetting and emulsifying agents are utilized and that this is comprehended within my invention. Further, such modifications as may be required to produce the desired solid or liquid dispersions under different conditions and uses are contemplated to be within the scope of this invention.

Having thus fully described my invention, what I claim as new and desire to secure by Letters Patent is:

1. As a new composition of matter, a water insoluble material selected from the group consisting of oils, bituminous substances and waxes emulsified with water and an alkali metal starchate having the general formula

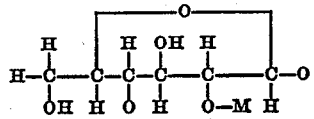

wherein M represents an alkali metal.

2. As a new composition of matter, a water insoluble substance selected from the group consisting of oils, bituminous substances and waxes emulsified with a product comprising an aqueous colloidal suspension of sodium starchate.

3. As a new composition of matter, oil emulsified with water and an alkali metal starchate having the general formula

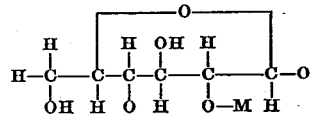

wherein M represents an alkali metal.

4. A method of forming dispersions of water insoluble substances selected from the group consisting of oils, bituminous substances and waxes in water comprising incorporating an emulsifying agent consisting of an alkali metal starchate with the substance to be dispersed in the aqueous medium, and thereafter thoroughly mixing the water with the other ingredients.

5. As a new wetting and emulsifying product, an alkali metal starchate dispersed in water.

6. As a new wetting and emulsifying agent, a colloidal dispersion of sodium starchate in water.

KENNETH M. GAVER.